(12) United States Patent
Grossman et al.

(10) Patent No.: US 7,102,689 B2
(45) Date of Patent: Sep. 5, 2006

(54) SYSTEMS AND METHODS FOR DECODING TELETEXT MESSAGES

(75) Inventors: Brad Grossman, Sunnyvale, CA (US); Aleksandr Movshovich, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 580 days.

(21) Appl. No.: 10/629,781

(22) Filed: Jul. 30, 2003

(65) Prior Publication Data

US 2004/0223083 A1    Nov. 11, 2004

Related U.S. Application Data

(60) Provisional application No. 60/467,574, filed on May 5, 2003.

(51) Int. Cl.
*H04N 7/00* (2006.01)

(52) U.S. Cl. ........................... 348/465; 348/468

(58) Field of Classification Search ................ 348/465, 348/468, 464, 461, 467, 540; 725/137; H04N 7/00, H04N 11/00
See application file for complete search history.

(56) References Cited

U.S. PATENT DOCUMENTS

| 4,712,131 A | * | 12/1987 | Tanabe ....................... 348/464 |
| 5,519,443 A | * | 5/1996 | Salomon et al. ............ 348/467 |

* cited by examiner

*Primary Examiner*—Sherrie Hsia
(74) *Attorney, Agent, or Firm*—Sterne, Kessler, Goldstein & Fox PLLC

(57) ABSTRACT

A system and method for efficiently detecting and decoding valid teletext message sequences is provided. A system is provided that includes a correlator, a sine wave generator, two time window generators, a phase detector, a framing code search engine, and a match filter. The method includes determining the phase of the run-in burst of a teletext message sequence, identifying the framing code location, deciding whether the teletext sequence is valid, and decoding the teletext data for display.

11 Claims, 4 Drawing Sheets

US 7,102,689 B2

SYSTEMS AND METHODS FOR DECODING TELETEXT MESSAGES

BACKGROUND OF THE INVENTION

This application claims the benefit of U.S. Provisional Application No. 60/467,574, filed May 5, 2003, which is incorporated in its entirety herein by reference.

FIELD OF INVENTION

The present invention relates to data transmission, and more particularly to decoding of teletext messages.

RELATED ART

Television systems have become increasingly complex as consumers continue to demand greater functionality and performance from television sets. One way in which television systems are providing increased functionality is through the use of the vertical blanking interval (VBI). VBI represents an industry standard that can be used to carry data, such as closed captioning and teletext. Circuitry within a television system is used to recognize the VBI data, and display the data on the television screen. Teletext can contain a plethora of information, including financial information, such as stock quotes, entertainment listings, advertisements, movie schedules, sports information and the like.

The teletext system represents a high speed VBI data transmission protocol. The North American Broadcasting Teletext Specification (NABTS) and European Telecommunication Standard (ETS) teletext specifications are two leading standards that specify teletext messaging protocols and parameters. Within the ETS teletext specification, a data clock rate of 6.9375 MHz is used, which is almost fourteen times faster than the clock rate used for closed captioning. As in the closed captioning case, the message data is preceded by a run-in burst. In the case of closed captioning, the run-in burst is a simple start bit. Whereas, in the case of the ETS teletext message, this simple start bit is replaced by a framing code byte of 0xE4. The NABTS version of teletext messaging is similar to that for ETS teletext messaging, except that the data rate of a NABTS teletext system is equal to 5.727 Mhz, and the framing code byte used is 0xE7. FIG. 1 illustrates a waveform of an ETS teletext signal. The waveform includes run-in burst 102, followed by a framing code 104, which has a value of 0xE4. Framing code 104 is followed by message data 106, which in this example contains 336 bits of data.

As consumers demand greater functionality and teletext messaging becomes more widely required, cost effective circuitry for reliably detecting and decoding Teletext messages is needed.

SUMMARY OF THE INVENTION

The present invention provides a system and method for efficiently decoding and detecting valid teletext message sequences. A system is provided that includes a correlator, a sine wave generator, two time window generators, a phase detector, a framing code search engine, and a match filter. The method includes determining the phase of the run-in burst of a teletext message sequence, identifying the framing code location, deciding whether the teletext sequence is valid and decoding the teletext data for display.

The invention provides an efficient way to accurately detect valid teletext messaging sequences, and to decode those sequences.

Further embodiments, features, and advantages of the present inventions, as well as the structure and operation of the various embodiments of the present invention, are described below.

DETAILED DESCRIPTION OF THE INVENTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

As used herein, the term "teletext" refers to any form of teletext messaging, including but not limited to ETS teletext messaging and NABTS teletext messaging.

Figure 1:
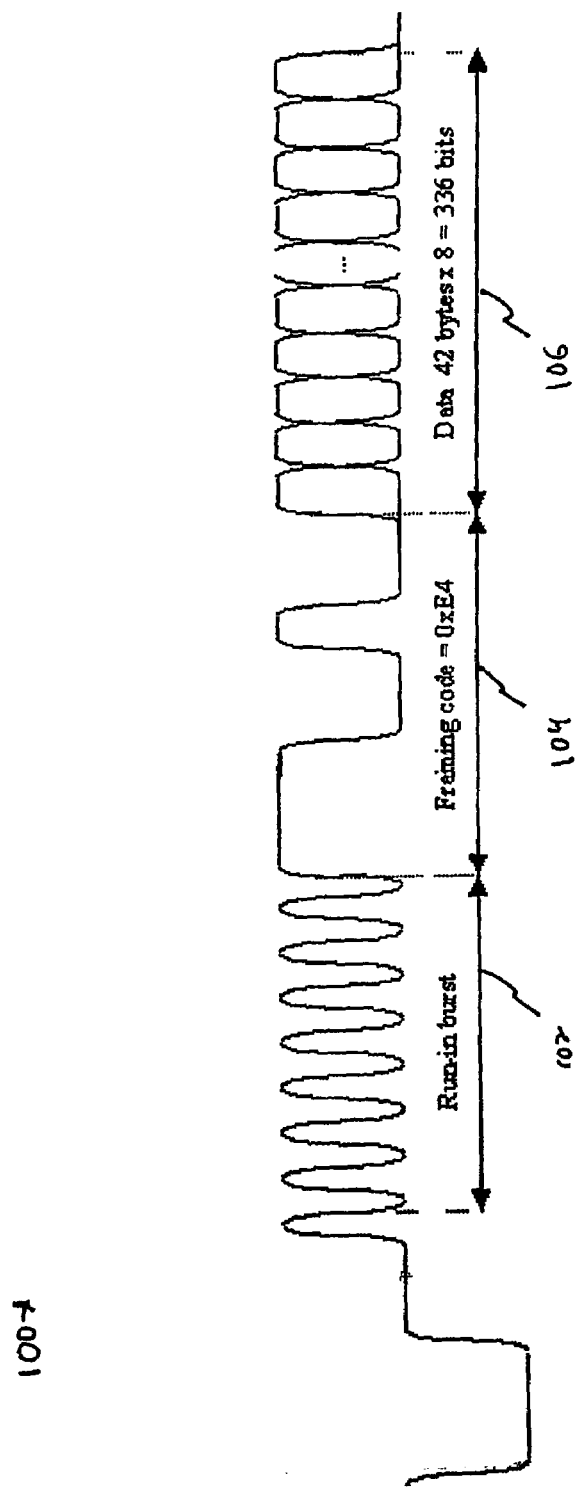
FIG. 1 is a timing diagram of an exemplary teletext sequence.
Figure 2:
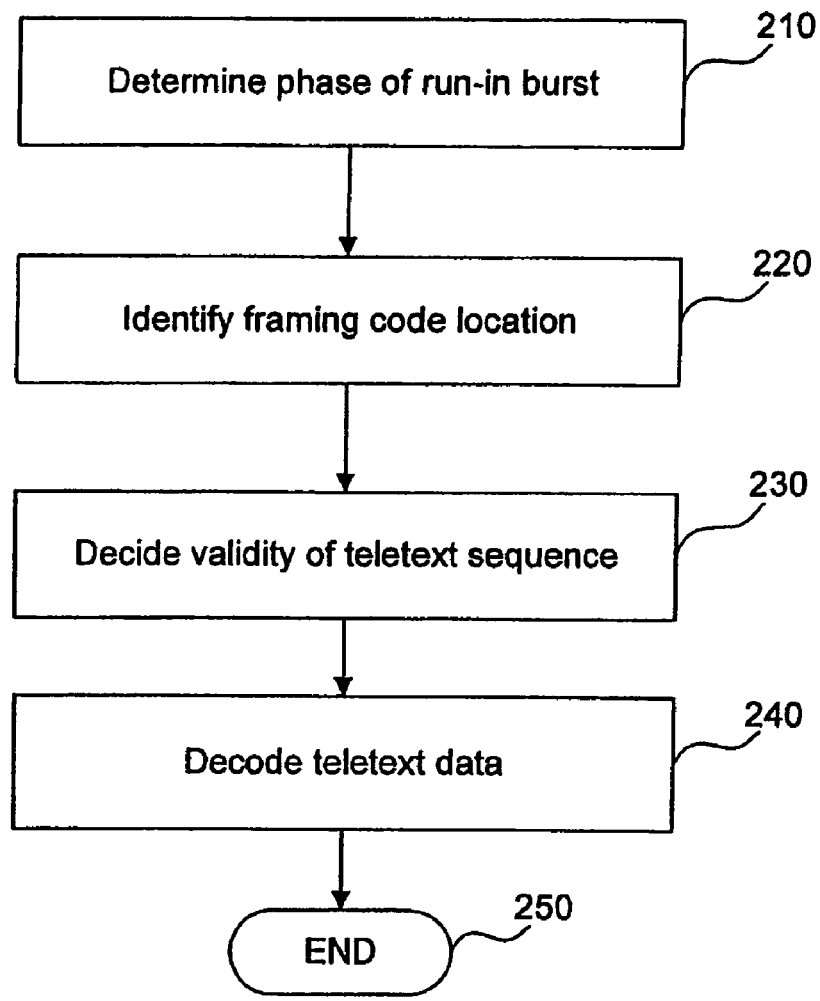
FIG. 2 is a flow chart of a method to detect and decode a teletext sequence, according to an embodiment of the invention.

FIG. 2 provides a flow chart of a method 200 to detect and decode a teletext sequence, according to an embodiment of the invention. Method 200 begins with Step 210. In step 210, the phase of the run-in burst is determined. FIG. 1 illustrates an example run-in burst 102. In one embodiment, the phase of the run-in burst is determined by correlating the incoming teletext signal with an internally generated sine wave of the expected teletext clock frequency. The correlation is calculated independently for every sample of the incoming signal.

The following mathematical expression describes the correlator function:

$$\mathrm{Corr}(nT) = \Sigma(In((n+i)*T)*\mathrm{Cos}(nT)), \quad (1)$$

$$i = \pm \Delta \quad (2)$$

Where,

Corr (nT) is the output sample of the correlator;

In (nT) is the actual sample of the incoming teletext signal;

Cos (nT) is the sample of the internally generated sine wave; and $\Delta$ is the range of the correlation.

The correlation generates a sine wave, which switches polarity from positive to negative when the phase of the incoming teletext run-in burst is 90° ahead of the phase of the internally generated sine wave, and switches polarity the other direction when the phase of the run-in burst is 90° behind. The zero crossing point of the correlation output signal is interpolated with sub-sample precision and phase, which is considered to be the phase of the teletext run-in burst.

Figure 3:
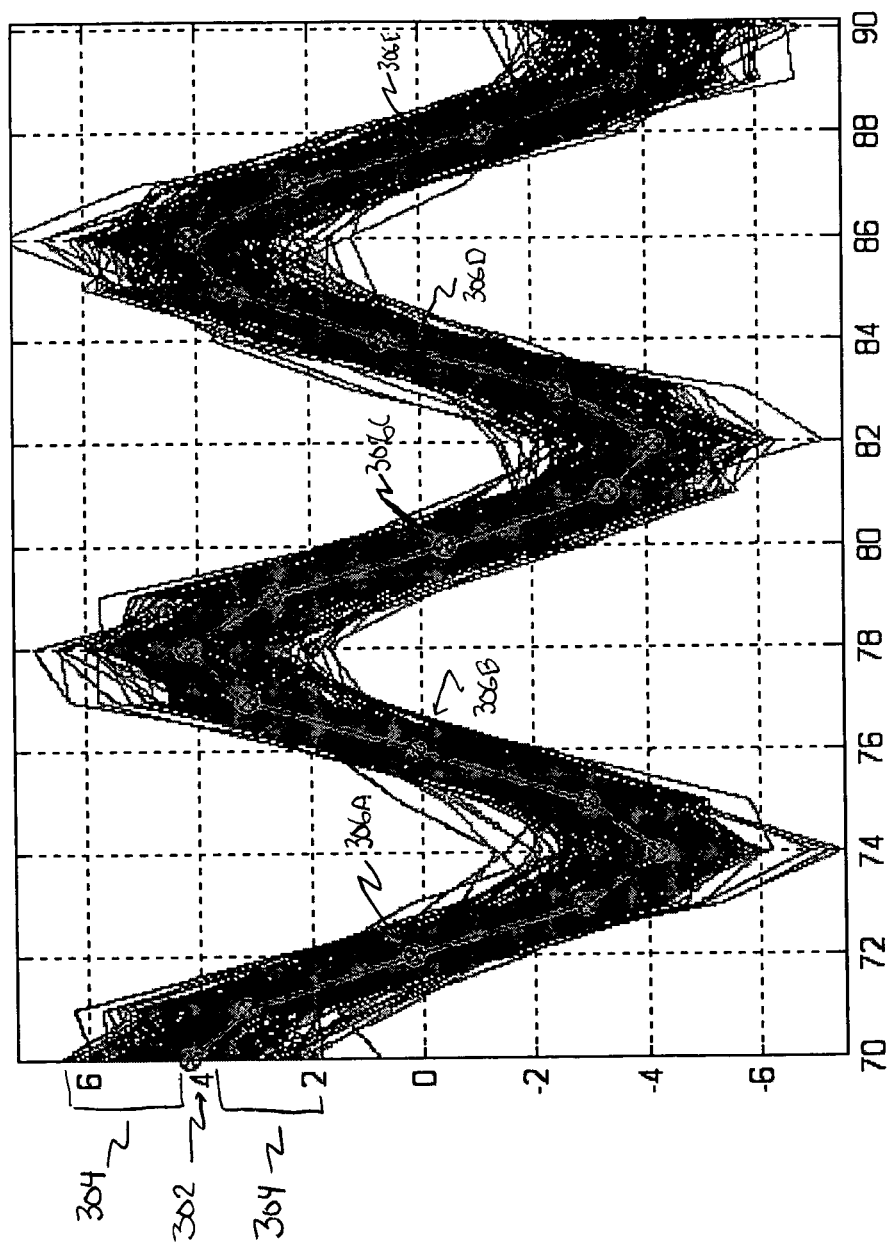
FIG. 3 is a diagram illustrating a correlator output, according to an embodiment of the invention.

FIG. 3 illustrates example correlation output signals 302 and 304. Output signal 302 represents a situation where there is substantially no noise on the incoming teletext data. Output signal 304 represents a situation where there is a S/N ratio of about 14 dB on the incoming teletext signal. Note the zero crossing points 306 of the signals 302 and 304 and their relative distances to one another. As can be seen from the plot of FIG. 3, the phase uncertainty even with the noise associated with signal 304 does not exceed ± 0.6 samples. In the case of an ETS signal this corresponds to no more than 15.4% of each data bit. In the case of a NABTS signal this corresponds to no more than 12.7% of each data bit.

Referring back to FIG. 2, in step 220 the framing code location is identified.

Referring back to FIG. 1, an example framing code 104 is illustrated for an ETS teletext signal. In one embodiment, the positive identification of the run-in burst is determined, before the framing code identification is attempted. The teletext sequence is searched using a sliding window mask for a match with a predefined framing code value. Bits in the sequence are matched utilizing data recovery techniques described below. Once the framing code is detected, the delay from an H-SYNC to the framing code location is calculated and is compared with the delay calculated during previous framing code acquisitions. H-SYNC is a signal provided to a video display device, such as a television, telling it to stop drawing the current horizontal line, and start drawing the next line.

If the newly acquired framing code location is within a certain predefined time (delta) from an averaged position of the framing code in preceding frames, the framing code is considered valid. Otherwise the framing code is considered invalid and the teletext data extraction for a particular line is cancelled. Based on the framing code acquisition data of every line, the averaged framing code location is adjusted.

In step 230 the validity of the teletext sequence is determined. There are many approaches to deciding on the validity of the teletext signal received by a teletext decoder. One approach is based on the teletext sequence simultaneously passing two tests. The first test determines whether that the frequency of the run-in burst is within reasonable limits from the frequency defined in the teletext standard. This test is performed on the run-in burst phase correlation output described above. The zero crossing points of the correlation output should occur within a certain number of samples of each other. The second test examines the framing code's relative location with respect to the H-SYNC pulse. In particular, the framing code during a particular line has to be decoded and its relative location with respect to the H-SYNC pulse has to be within a certain limit from the averaged position of the framing code location in the previous frames.

In step 240, the teletext data is decoded, such as teletext data 106 in FIG. 1. Under relatively low noise conditions, the teletext data can be sampled. The samples can then be averaged to improve overall system performance. Under relatively heavy noise conditions, however, a matched filtering of the incoming signal is recommended to maximize the S/N ratio. The reason for this is the substantially higher bit rate of the teletext messages versus closed captioning messages. In fact, there are typically only about 3–4 samples per one bit of teletext data. The coefficients used during the matched filtering are selected based on the phase of the run-in burst in the current line and relative location of each bit in respect to the samples of the incoming signal. In step 250, the method ends.

An alternative description of the method 200 highlights additional features and benefits of the invention. As with respect to step 210, a correlation with a sine wave of the same frequency as the teletext run-in burst is performed in order to determine the phase of the run-in burst relative to the sine wave. The teletext run-in burst is also multiplied by a windowing function in order to reduce the number of samples needed and to reduce the effect of noise. At those points where the result of this correlation is zero, the run-in lags the sine wave by 90°. If an accurate calculation of one of these zeroes can be made, the phase of the run-in sequence can be determined.

The zeroes should be located with an accuracy of greater than one cycle. Since one cycle at run-in frequency includes 7.7 samples in ETS teletext and 9.2 samples in NABTS teletext, each sample represents a 46.25° or 38.18° change in phase for ETS and NABTS teletext, respectively. The zeroes are located by detecting a change in phase between successive samples, then interpolating between these points in order to obtain the fractional part. Since it is desirable that the generated sine wave lag the signal by 90°, a positive zero (i.e., a zero with a positive slope through it), which would indicate a phase of 0° as opposed to 180°, is used as a starting point to generate the sine wave signal. A second positive zero in the run-in burst is used as a starting point for the generation of the sine wave. To further refine the placement of the second positive zero, this point is averaged with the midpoint of two neighboring negative zeroes and the midpoint of two neighboring positive zeroes.

Because a correlation function is being used, the placement of the zeroes will not be known until some fixed time after the fact. The actual starting sample is the integer portion of the zero found plus a fixed delay. At that time, the generation of the sine wave begins. However, the phase of the sine wave continues to change. This fixed delay is compensated for by utilizing the phase change per sample figures above, i.e., for an 18 cycle delay in an ETS teletext signal, the phase will change by 18*46.25°=832.4°−720°=112.5°. The phase must also compensate for the fractional part of the zero location, by also utilizing the delay per sample. For sake of mathematical simplicity, the fractional part of the zero location is multiplied by 45° to generate this phase adjustment.

As with a phase locked loop method of phase generation, the phase of the sine wave generated here is fed into a matched filter to decode the data contained within the teletext signal. The phase of the generated sine wave will be 90° off of the phase needed by the matched filter. This is compensated for by adding 90° to the phase generated.

In this method, the run-in burst does not need to lock over multiple frames; it locks using only the run-in burst for the given line, as was discussed in step 220 above. Because of this, a determination of whether the current run-in burst is valid need not be made. Locking of the run-in burst for a given line can be performed in a variety of ways. There is a signal accumulation mechanism that accumulates the absolute value of the difference between the correlated signal and zero. If the sum generated by this mechanism is below a certain threshold, a no signal status bit will go on and the run-in decoder will be instructed to decode a line that contains another VBI standard, such as closed captioning. To prevent this as being seen as a teletext line, the average distance between zeros of the signal correlation is calculated. Since each cycle at run-in frequency will have two zeroes at 0° and 180°, the average zero distance will be about half the number of samples contained in a run-in sequence, i.e., 3.9 for ETS teletext and 4.7 for NABTS. If the average is too far from this, the signal will not be considered a valid teletext line.

Figure 4:
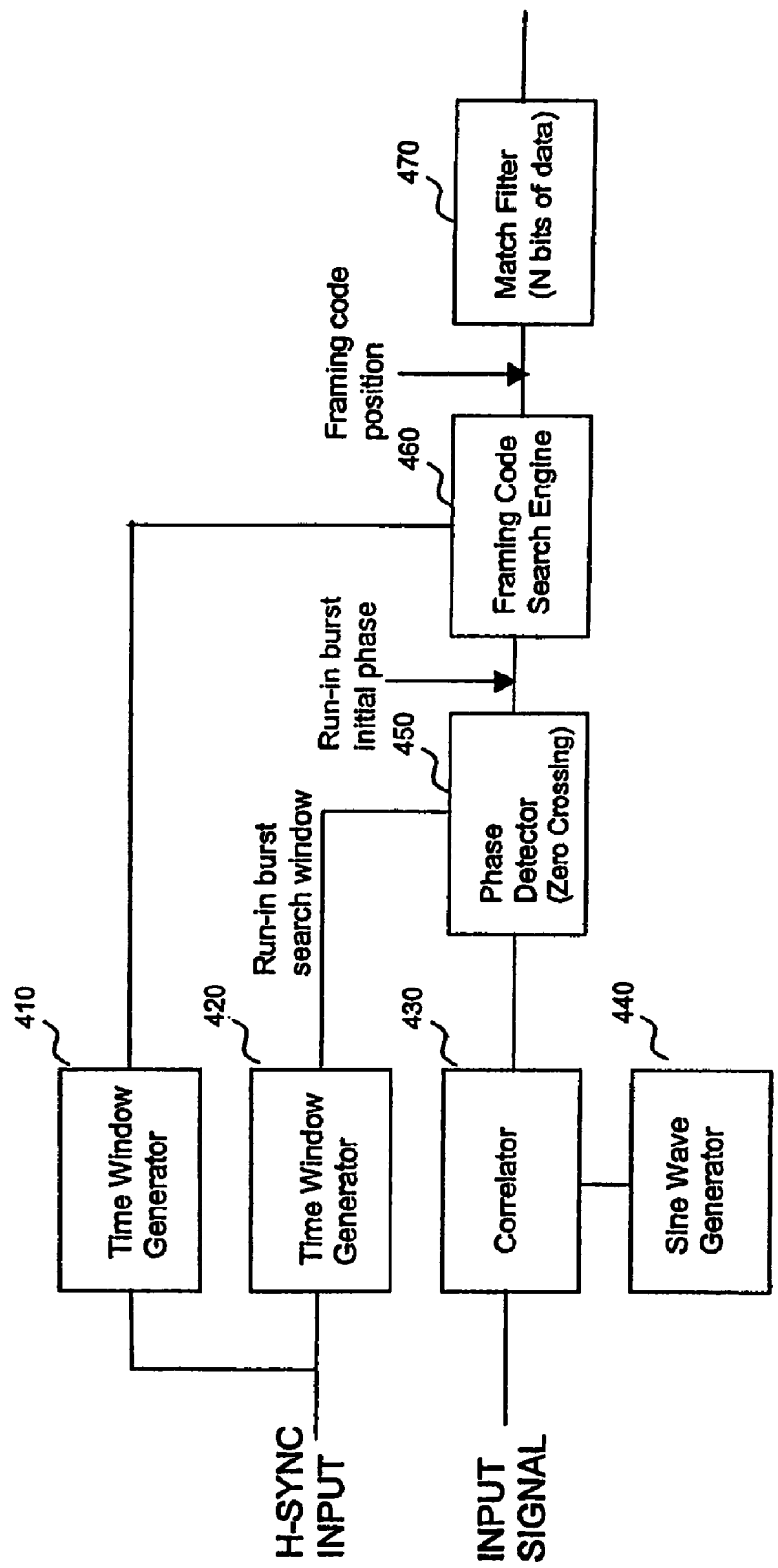
FIG. 4 is a block diagram of a system for detecting and decoding teletext message sequences, according to an embodiment of the invention.

FIG. 4 illustrates an embodiment of a teletext detector and decoder system that can be used to detect and decode a teletext messaging sequence. The system comprises correlator 430, a sine wave generator 440, first time window generator 410, second time window generator 420, phase detector 450, framing code search engine 460 and match filter 470. Correlator 430 receives an input signal and is coupled to sine wave generator 440. The output of correlator 430 is coupled to phase detector 450, which determines zero crossings of correlator 430. Phase detector 450 also receives as an input a run-in burst search window through a coupling with first time-window generator 410. The first time window generator 410 receives an H-SYNC input to generate a time-window. The output of phase detector 450 is coupled to the input of framing code search engine 460. Framing code search engine 460 is also coupled to second time window generator 420. Second time window generator 420 receives an H-SYNC input to generate a time-window. The output of framing code search engine 460 is coupled to the input of match filter 470. The output of the matched filter 470 provides the data message to be displayed as teletext on a monitor.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. A method of processing data within a teletext sequence, comprising:
 (a) determining a phase of a run-in burst within the teletext sequence;
 (b) identifying a location of a framing code within the teletext sequence; and
 (c) validating the teletext sequence.

2. The method of claim 1, further comprising:
 (d) decoding the teletext sequence.

3. The method of claim 1, wherein step (a) comprises correlating the teletext signal with a sine wave of an expected teletext clock frequency, wherein zero crossing points of a correlation output signal are used to determine the phase of the run-in burst.

4. The method of claim 3, wherein the correlating comprises using a correlator function,
 Corr $(nT)=\Sigma(In((n+i)*T)*Cos(nT))$,
 wherein $i=\pm\Delta$,
 wherein Corr $(nT)$ is an output sample of a correlator,
 wherein In $(nT)$ is an actual sample of the teletext sequence,
 wherein Cos $(nT)$ is a sample of the sine wave, and
 wherein $\Delta$ is a range of the correlation.

5. The method of claim 1, wherein step (b) further comprises:
 (i) using a sliding window mask to search teletext data for a match with a predefined framing code value and to identify a framing code detection location;
 (ii) calculating a delay from a H-SYNC signal to the framing code detection location; and
 (iii) comparing the delay determined in step (ii) with delays calculated during previous framing code acquisition cycles.

6. The method of claim 5, further comprising declaring the framing code valid when the delay determined in step (ii) is within a predefined time from an averaged position of previous framing codes.

7. The method of claim 5, further comprising declaring the framing code invalid when the delay determined in step (ii) is not within a predefined time from an averaged position of previous framing codes.

8. The method of claim 1, further comprising outputting the decoded teletext sequence to a set-top box.

9. The method of claim 1, further comprising outputting the decoded teletext sequence to a television.

10. A system for processing teletext message sequences, comprising:
 a correlator coupled to an input;
 a sine wave generator coupled to said correlator;
 a first time window generator coupled to an H-SYNC input;
 a phase detector coupled to outputs of said correlator and said first time window generator;
 a second time window generator coupled to said H-SYNC input; and
 a framing code search engine coupled to outputs of said phase detector and said second time window generator.

11. The system of claim 10, further comprising:
 a matched filter coupled to an output of said framing code search engine.

* * * * *